(12) United States Patent
Brooks (10) Patent No.: US 11,083,171 B1
(45) Date of Patent: Aug. 10, 2021

(54) ANIMAL OPERATED BRUSHING STAND

(71) Applicant: Ron D. Brooks, Waupaca, WI (US)

(72) Inventor: Ron D. Brooks, Waupaca, WI (US)

( * ) Notice: Subject to any disclaimer, the term of this patent is extended or adjusted under 35 U.S.C. 154(b) by 0 days.

(21) Appl. No.: 17/191,182

(22) Filed: Mar. 3, 2021

(51) Int. Cl.
*A01K 13/00* (2006.01)

(52) U.S. Cl.
CPC ........ *A01K 13/004* (2013.01); *A01K 2227/10* (2013.01)

(58) Field of Classification Search
CPC .................................................. A01K 13/004
USPC ................................ 119/608, 609, 621, 622
See application file for complete search history.

(56) References Cited

U.S. PATENT DOCUMENTS

| | | |
|---|---|---|
| 9,125,378 B1 | 9/2015 | Frost et al. |
| 9,986,719 B1 * | 6/2018 | Sanders ............... A01K 13/004 |
| 2003/0209209 A1 | 11/2003 | Udelle et al. |
| 2007/0000450 A1 | 1/2007 | Otten |
| 2007/0245975 A1 | 10/2007 | Udelle et al. |
| 2011/0174234 A1 | 7/2011 | Friberg et al. |
| 2014/0090607 A1 | 4/2014 | Dole et al. |
| 2015/0020747 A1 * | 1/2015 | Mazeris ............... A01K 29/005 119/601 |
| 2015/0136039 A1 | 5/2015 | Van Der Poel |

FOREIGN PATENT DOCUMENTS

| | | |
|---|---|---|
| DE | 102018131634 A1 | 10/2020 |
| EP | 2008512 A1 | 12/2008 |

* cited by examiner

*Primary Examiner* — David J Parsley
*Assistant Examiner* — Danielle A Clerkley
(74) *Attorney, Agent, or Firm* — Epiphany Law, LLC (57) ABSTRACT

A brushing stand operable by an animal. The stand includes a base, a tubular stand connected thereto, a body portion extending upward away therefrom, the body portion selectively adjustable up and down. The tubular stand includes an arm portion extending horizontally away from the body portion, with a hand portion at an end of the arm and extending downward. A brush motor is connected to the arm portion and releasably and pivotally attached to the brush extending downward that spins around a vertical axis and also swings around a horizontal arc. An internal fluid pathway extends from the arm portion to the base and a vacuum sucks up animal hair in proximity thereto. A proximity sensor communicates with a controller to turn on the motor and the vacuum when the animal is in proximity to the base.

20 Claims, 8 Drawing Sheets

ANIMAL OPERATED BRUSHING STAND

TECHNICAL FIELD

This invention relates to an animal self-grooming devices, and more particularly, a combination vacuum and brush for automated petting or scratching of pets such as dogs or cats, while also collecting and disposing of their dander and loose hair.

BACKGROUND

At the present time it is estimated that there are more than 80 million households in the United States owning companion animals, such as domesticated dogs or cats, as pets and the popularity of these domestic pet animals continues to grow. Most pet-owning families, more or less, live with the problem of loose animal hair and dander around the home. This loose hair clings to clothing and carpeting, gets imbedded into the fibers of fabric upholstery and can be difficult to remove. Not only can it be unsightly, loose animal hair and dander can also be a health hazard to humans by getting into food or causing allergies for the family members if left unattended too long. Routine brushing is a way to keep the animal—and surrounding home—clean. When brushing of the animal is neglected the daily dilemma of loose animal hair in the home is even more difficult to control.

One typical approach to addressing the problems associated with loose animal hair is taking the pet for routine grooming. However, this can be an expensive solution since cost of regular grooming appointments can quickly add up and may put a strain on the household to make payments on other expenses. Additionally, this approach does not entirely remove the problem of loose animal hair and dander around the home since the animal continues to shed hair in between appointments when interacting with home surfaces and furniture.

Another approach is brushing the pet at home regularly. However, doing so requires human participation, which may be prohibit regular brushing due to the pet-owner's hectic and varied schedule. Additionally, the owner may be unable to corral a skittish playful animal long enough to complete adequate brushing. Moreover, this regular at home brushing can still lead to loose hair and dander around the home since it requires cleaning or vacuuming up of the discarded hair after brushing, which can be a time-consuming and frustrating task for the pet owner. Unfortunately, this frustration may lead to the pet owner foregoing brushing of the pet altogether, which can lead to distress on the animal and/or an even greater excess of pet hair scattered around the home. Accordingly, none of the existing approaches have proven completely satisfactory, so there is opportunity for improvements.

SUMMARY

A device is needed to both groom and vacuum loose hair and dander from an animal's coat without so much human participation. And, if that can be done by the pet on its desired schedule, automatically, it is likely to happen more often and be better for the pet and its owner.

To address the need for better pet grooming in light of one or more of the existing deficiencies in the art, there is provided a brushing stand operable by an animal. The stand includes a base with a tubular stand connected to the base and having a body portion extending upward away from the base. The body portion is selectively adjustable between a down position and an up position. The tubular stand includes an arm portion at a distal end of the body portion and the arm portion extending horizontally away from the body portion. A hand portion is at an end of the arm portion and separated from the body portion by the arm portion. The hand portion is extending downward away from the arm portion. A brush motor is connected to the hand portion and a brush is releasably and pivotally attached to the brush motor at a proximal end of the brush. The brush is extending downward away from the brush motor and has a brush distal end. The brush is operated by the brush motor to spin the brush around a vertical axis of the brush while the brush distal end is also able to swing around a horizontal arc relative to the proximal end of the brush. An internal fluid pathway is extending from the hand portion to the base and configured to receive animal hair and have the animal hair pass therethrough to a vacuum. The vacuum is configured to create negative pressure within the internal fluid pathway and suck up animal hair in proximity to the hand portion and the base. A proximity sensor is mounted in position to sense when the animal is in proximity to the brush. A controller is connectable to a power source and electrically connected to each of the brush motor, the vacuum and the proximity sensor. The controller is designed to: (i) receive an animal sensing signal from the proximity sensor, (ii) operate the brush motor in response to the animal sensing signal, and (iii) operate the vacuum in response to the animal sensing signal.

In other aspects there is a portable brushing stand operable by an animal. The stand has a base with a tubular stand connected to the base and having a body portion extending upward away from the base. The body portion is selectively adjustable between a down position and an up position by an adjustment motor connected to the body portion. Operating the adjustment motor moves the body portion between the down position and the up position. The tubular stand is including an arm portion at a distal end of the body portion. The arm portion is extending horizontally away from the body portion. A hand portion is at an end of the arm portion and separated from the body portion by the arm portion. The hand portion is extending downward away from the arm portion. A brush motor is connected to the hand portion and a brush is releasably and pivotally attached to the brush motor at a proximal end of the brush. The brush is extending downward away from the brush motor and having a brush distal end. The brush is operated by the brush motor to spin the brush around a vertical axis of the brush while the brush distal end is also able to swing around (i) a horizontal arc relative to the proximal end of the brush and (ii) a vertical arc relative to the proximal end of the brush. An internal fluid pathway is extending from the hand portion to the base and configured to receive animal hair and have the animal hair pass therethrough to a vacuum. The vacuum is configured to create negative pressure within the internal fluid pathway and suck up animal hair in proximity to the hand portion and the base. A proximity sensor is mounted to the tubular stand to sense when the animal is in proximity to the base, the stand or the brush. A controller is electrically connected to each of the adjustment motor, the brush motor, the vacuum and the proximity sensor. The controller is designed to: (i) receive an animal sensing signal from the proximity sensor, (ii) operate the brush motor in response to the animal sensing signal, and (iii) operate the vacuum in response to the animal sensing signal.

In yet other aspects there is a brushing stand operable by an animal. The brushing stand includes a tubular stand being selectively adjustable between a down position and an up position. The tubular stand includes an internal fluid pathway extending from a base end to a hand end and configured to receive animal hair and have the animal hair pass therethrough. A vacuum is mounted and configured to create negative pressure within the internal fluid pathway and suck up animal hair in proximity to at least one of the base end and the hand end. A brush motor is connected to the tubular stand. A brush is releasably and pivotally attached to the brush motor at a proximal end of the brush. The brush is extending downward away from the brush motor and has a brush distal end. The brush is operated by the brush motor to spin the brush around a vertical axis of the brush while the brush distal end is also able to swing around a horizontal arc relative to the proximal end of the brush. A proximity sensor is mounted in position to sense when the animal is in proximity to the tubular stand or the brush. A controller is connectable to a power source and electrically connected to each of the brush motor, the vacuum and the proximity sensor. The controller is designed to (i) receive an animal sensing signal from the proximity sensor, (ii) operate the brush motor in response to the animal sensing signal, and (iii) operate the vacuum in response to the animal sensing signal.

Also described herein are features related to the configuration of the stand, the sensors and adjustability of the stand, and the brush and how it moves and is connected to the brush motor.

BRIEF DESCRIPTION OF THE DRAWINGS

The invention may be more completely understood in consideration of the following detailed description of various embodiments of the invention in connection with the accompanying drawings, in which.

The drawings show some but not all embodiments. The elements depicted in the drawings are illustrative and not necessarily to scale, and the same (or similar) reference numbers denote the same (or similar) features throughout the drawings unless otherwise stated.

DETAILED DESCRIPTION

Figure 1:
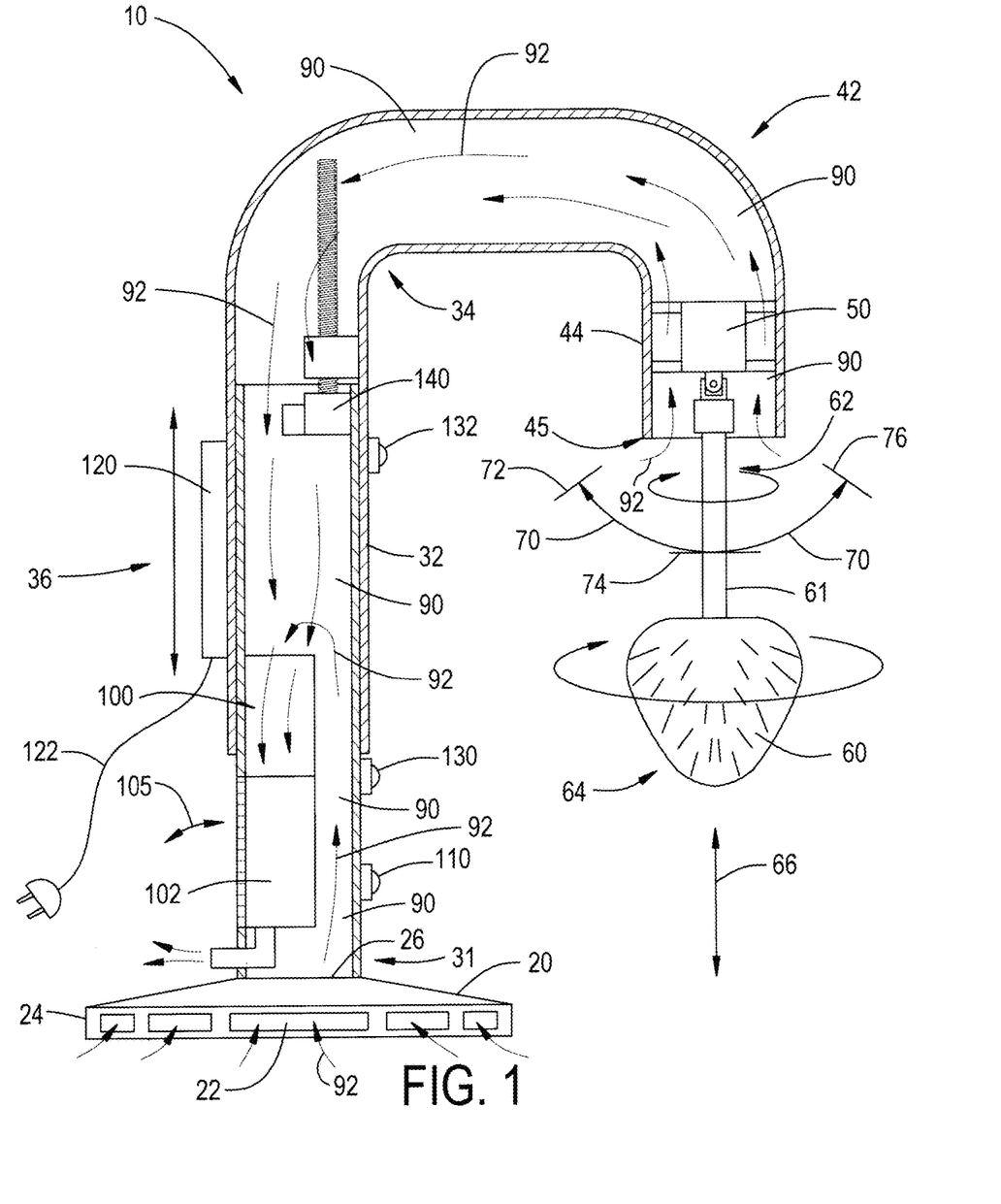
FIG. 1 is a schematic cross-sectional side view of the portable brushing stand of the invention in the down position.
Figure 2:
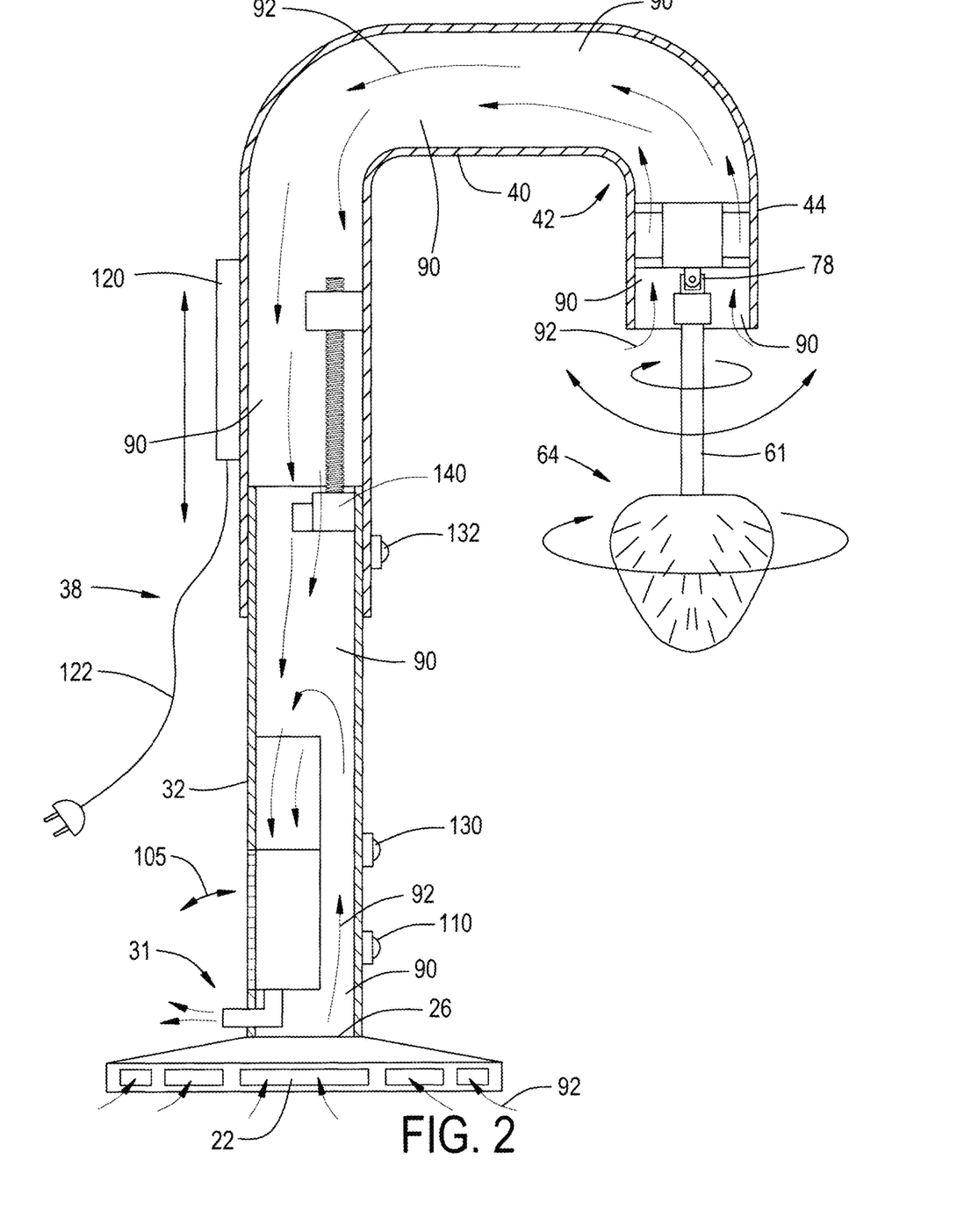
FIG. 2 is a schematic cross-sectional side view similar to that of FIG. 1 but now showing the portable brushing stand in the up position.
Figure 7:
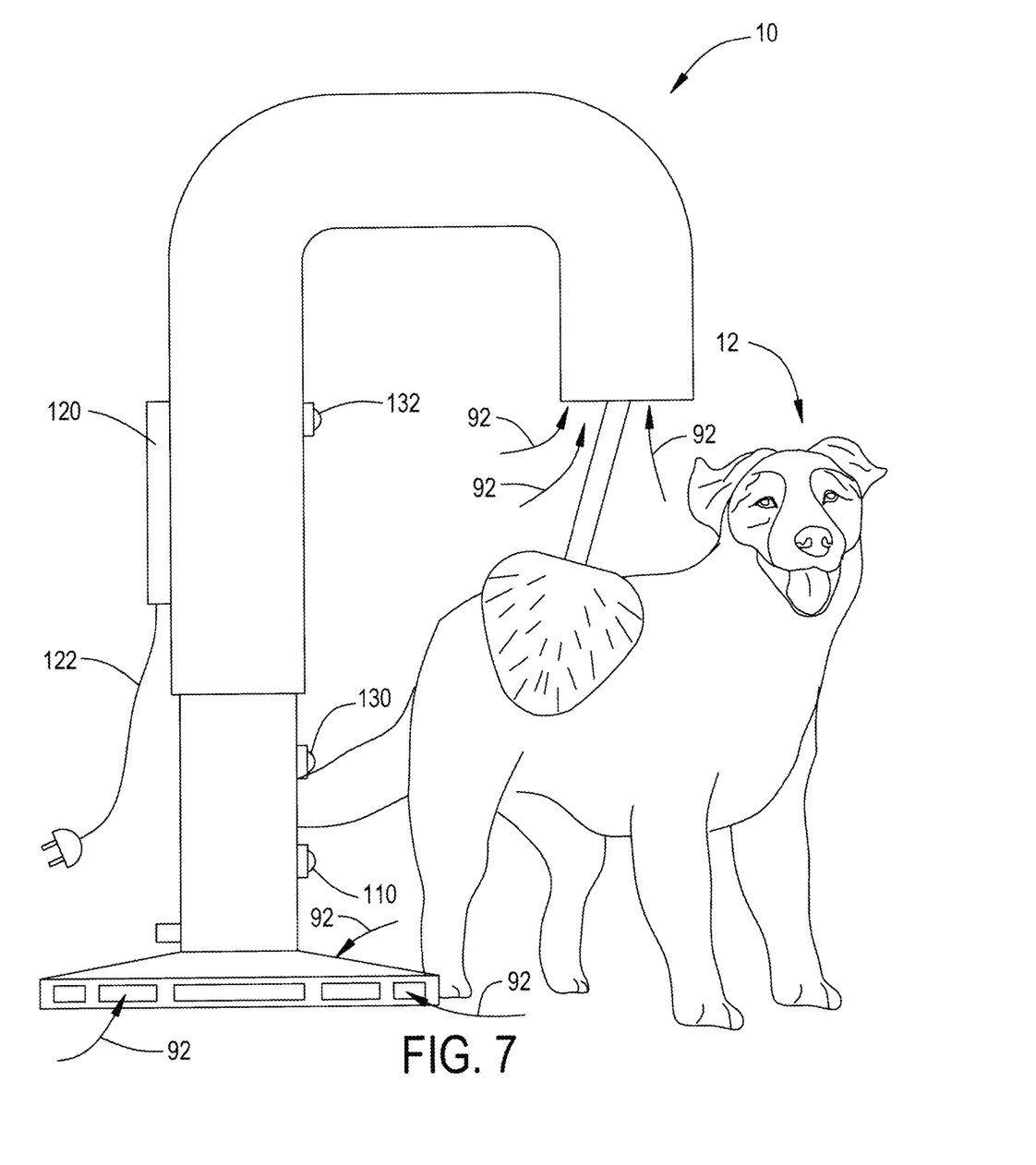

In accordance with the practice of at least one embodiment of the invention, as seen in the Figures, for example FIGS. 1,2 and 7 for reference here, is a portable brushing stand 10 operable by an animal 12. The brushing stand 10, preferably portable, includes a base 20 with a tubular stand connected to the base 20 at base end 31, and a body portion 32 extending upward away from the base 20 and base end 31. The body portion 32 is selectively adjustable between a down position 36 (FIG. 1) and an up position 38 (FIG. 2), e.g., including the position of the stand as seen in FIG. 7 between fully up and fully down.

The base is connected to the tubular stand and includes a weight and diameter sufficient to keep the tubular stand essentially upright during use of the stand. For example, the overall weight of the device may be configured so at least 60%, preferably 65% and more preferably 70%, of the weight is in the base 20 and the body portion 32 as compared to the arm portion 40 and hand portion including brush motor 50 and brush 60. As to dimensions for the base, for example, it has a diameter depending on the weight of the overall device to prevent the stand from tipping over during use of the stand, with and without the animal 12 engaging a brush 60. The base 20 also includes an internal hollow portion 22 extending from a perimeter 24 of the base to a center 26 of the base 20 that is in communication with an internal fluid pathway 90. In this way, when there is negative pressure within the internal fluid pathway 90 and the internal hollow portion 22, the stand can suck up animal hair in proximity to the perimeter 24 of the base 20, as designated by the air flow arrows 92.

The tubular stand includes an arm portion 40 at a distal end 34 of the body portion 32. The arm portion 40 extends horizontally away from the body portion 32, with a hand portion 44 at an end 42 of the arm portion 40. As used herein, "extends horizontally away" includes any horizontal component with or without some vertical component as well. The hand portion 44 extends downward away from the arm portion 40 and terminates in hand end 45. The arm portion 40 separates the hand portion 44 from the body portion 32.

Figure 1B:
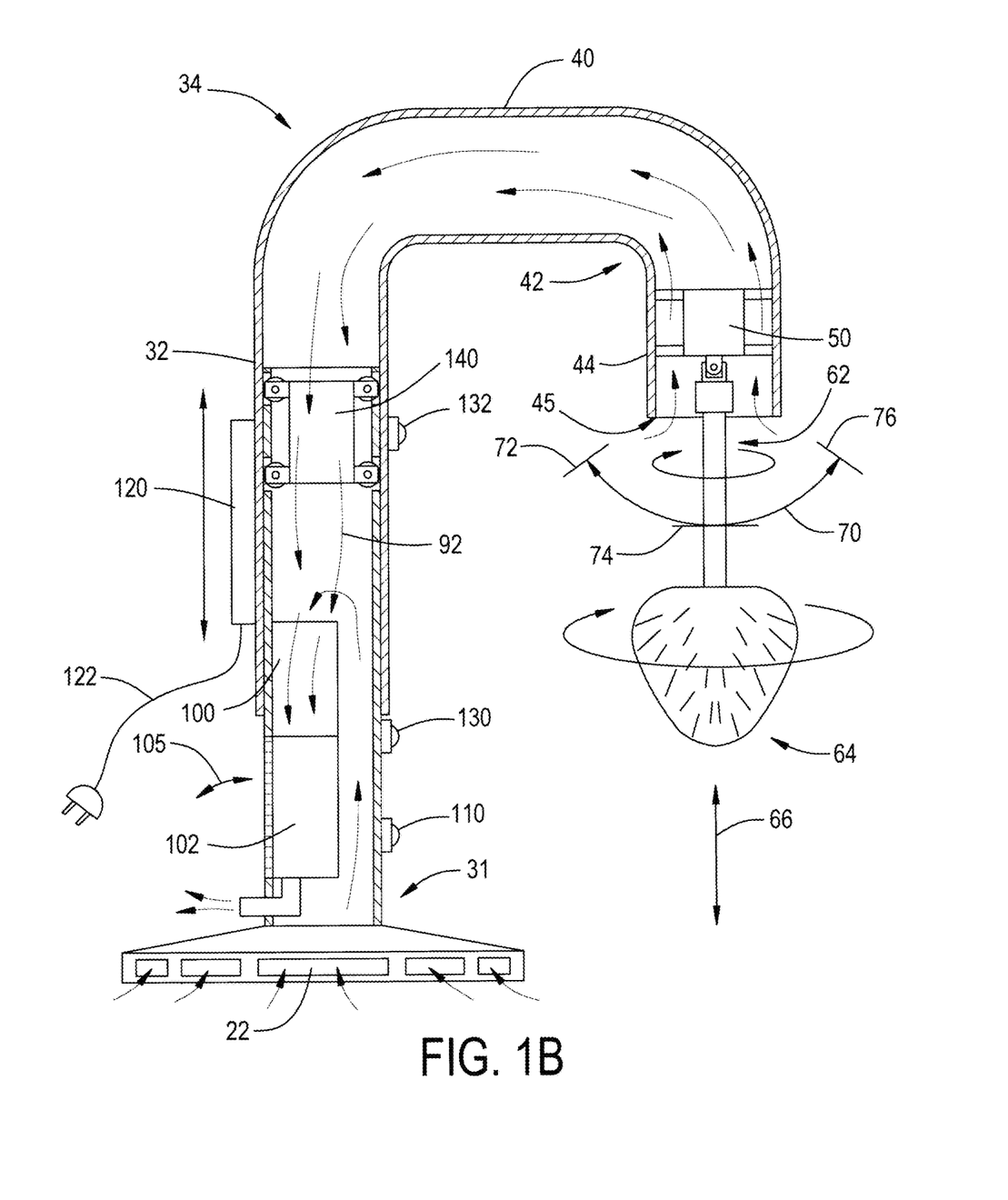
FIG. 1B is a schematic cross-sectional side view of an alternate portable brushing stand of the invention in the down position.
Figure 3:
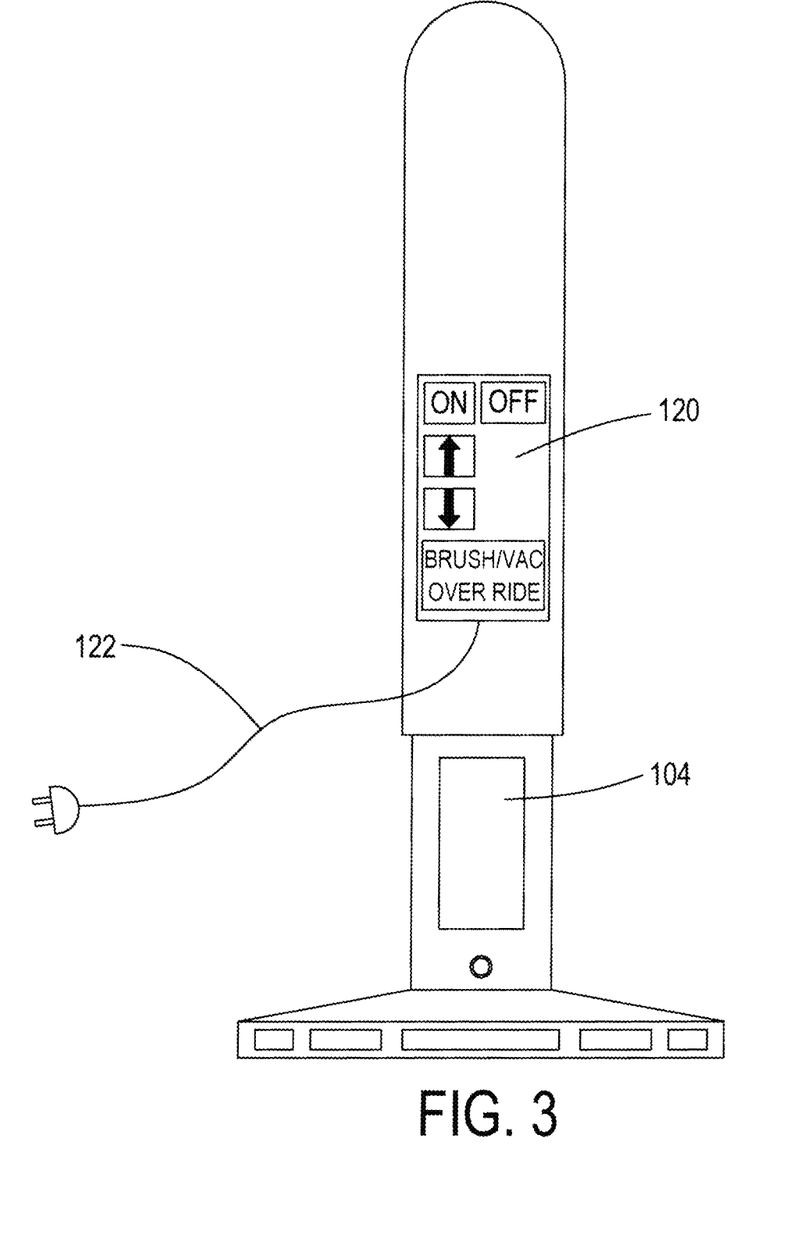
FIG. 3 is a rear view of the portable brushing stand seen in FIG. 1.
Figure 4:
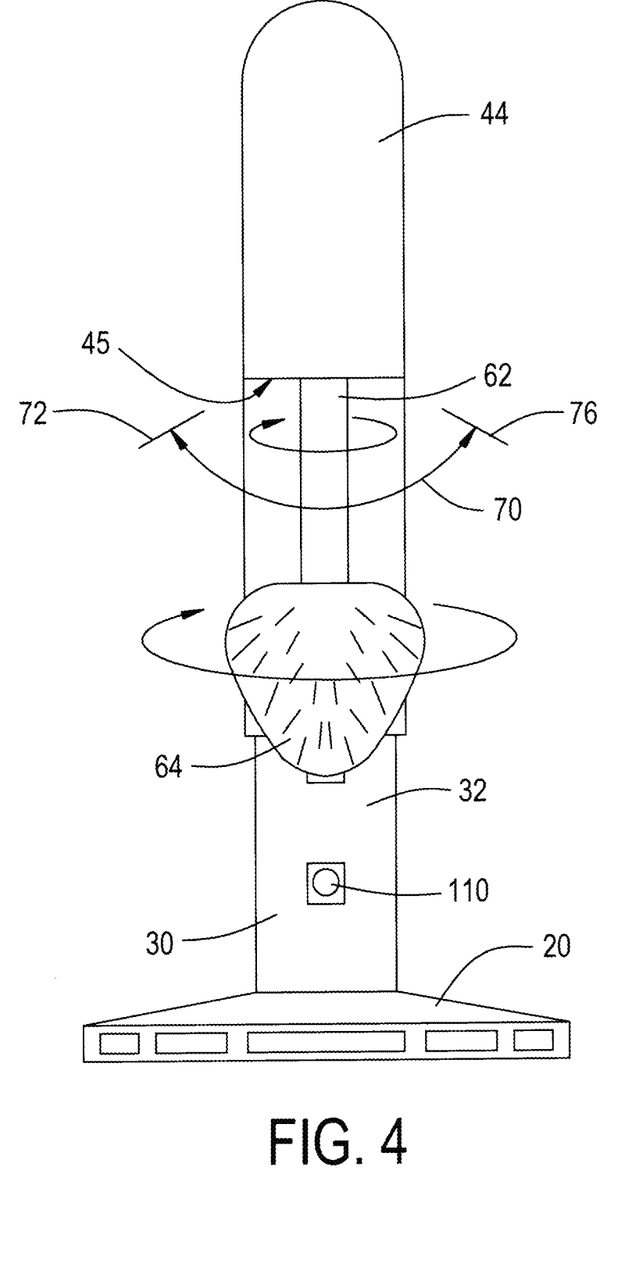
FIG. 4 is a front view of the portable brushing stand seen in FIG. 1.

The body portion 32 is selectively adjustable by an adjustment motor 140, which can be connected to the body portion 32. For example, this adjustment can be by an acme screw arrangement (FIGS. 1 and 2), wall rollers arrangement (FIG. 1B) or other conventional motorized linear adjustment mechanism to achieve the desired movement of the stand as taught herein. Operating the adjustment motor 140 moves the body portion 32 between the down position 36 and the up position 38. The adjustment motor 140 may be controlled by a controller 120 electrically communicating with the adjustment motor 140 to move the body portion 32 between the down position 36 and the up position. Additionally, the controller 120 may be manually influenced or controlled to further adjust the up and down positioning as desired, and adjustment of the motor 140 can be completely manually controlled. For example, buttons can be used as seen in FIG. 3 for controller 120, where "ON" and "OFF" control the overall power to the controller and electrically connected components, the up arrow moves the stand up and the down arrow moves it down, and the "BRUSH/VAC OVERRIDE" keeps the brush and/or vacuum on continuously regardless of the proximity sensor. These buttons may be single touch or multi-touch to toggle between their desired operating output. Still further, the selective adjustability may be completely manual and selective adjustability includes a temporarily fixed position, when able to move between at least two positions. In a preferred feature, the adjustment motor 140 is wholly contained inside the tubular stand.

Figure 5:
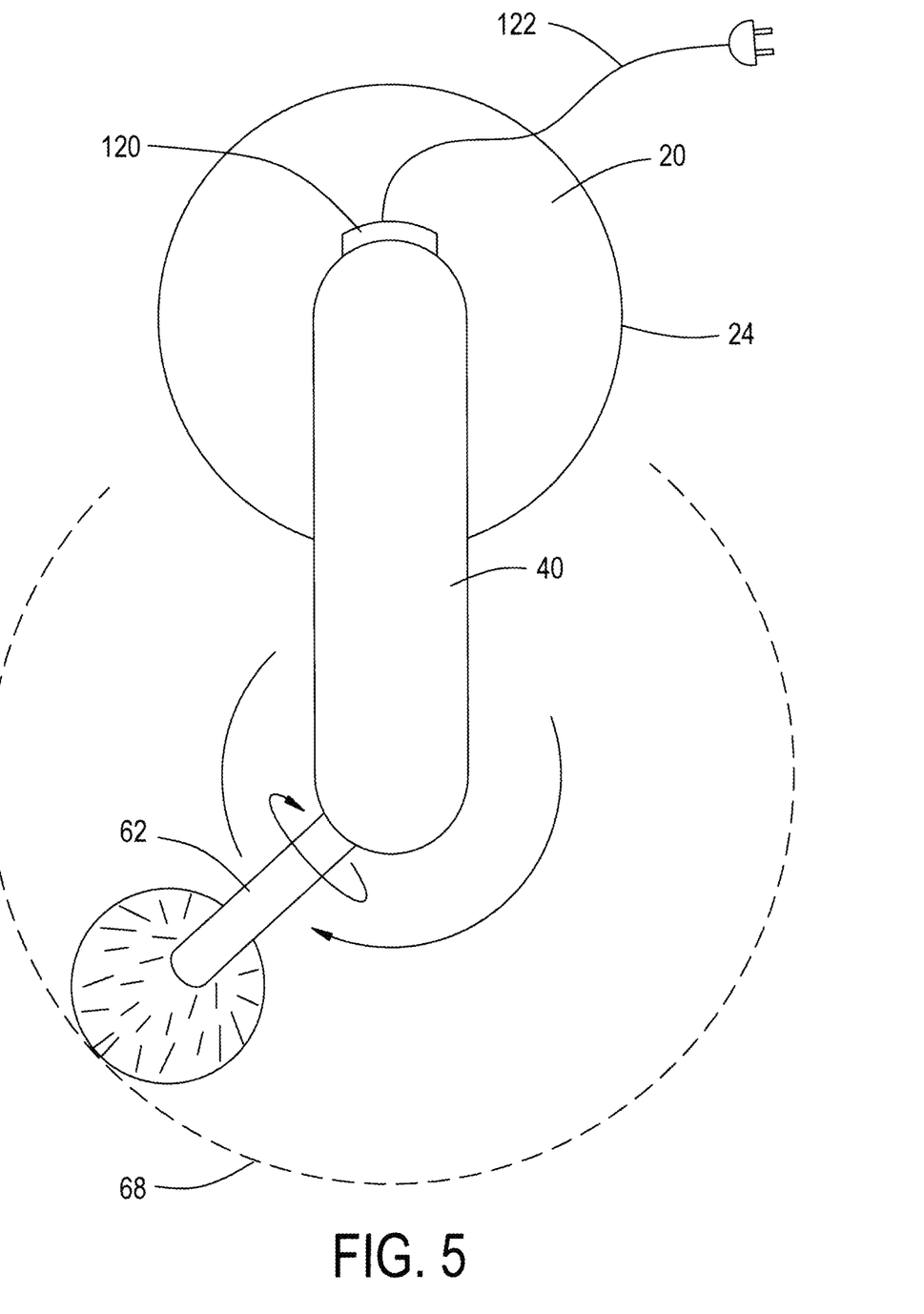
FIG. 5 is a top view of the portable brushing stand seen in FIG. 1.
Figure 6:
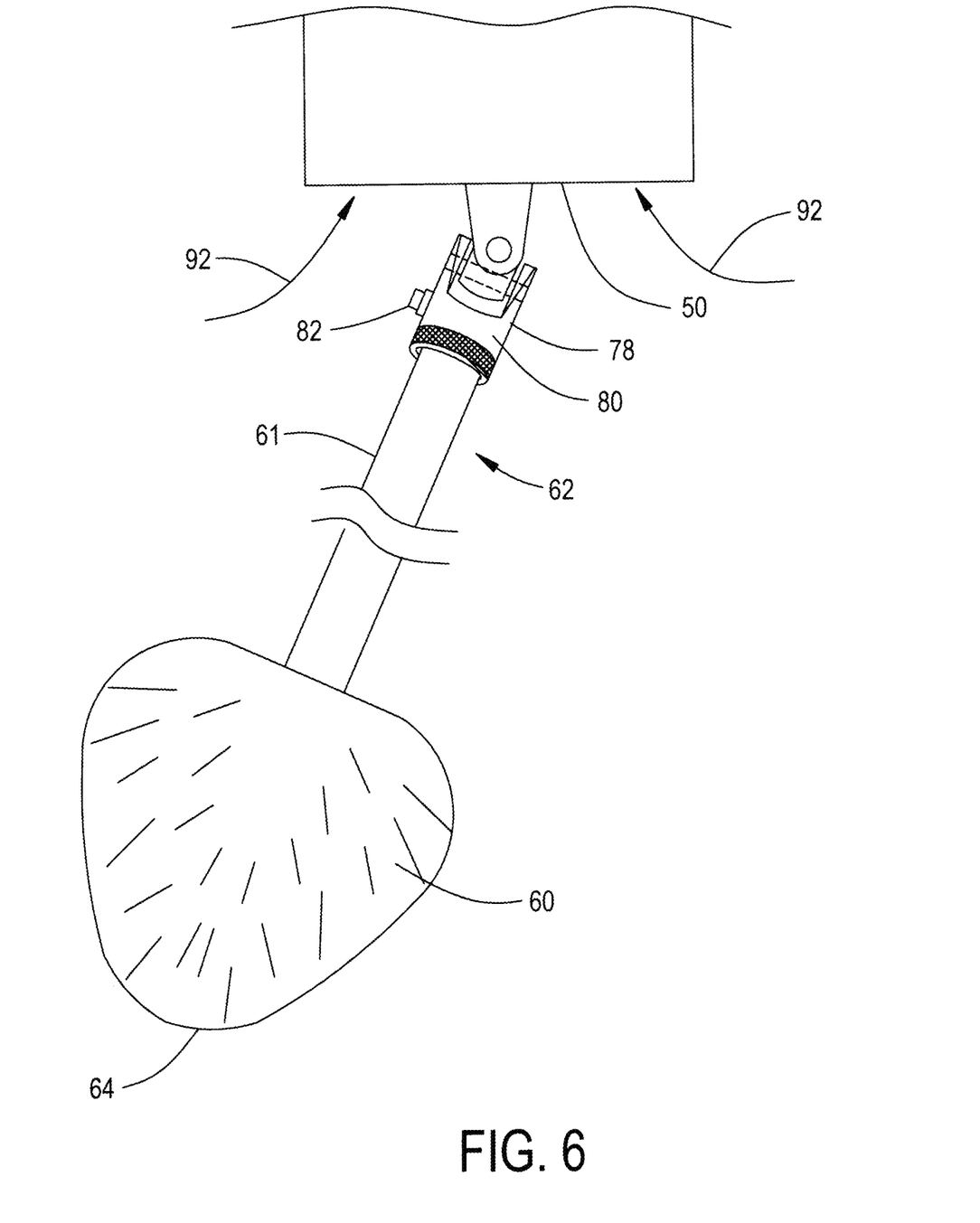
FIG. 6 is an enlarged front view of the hand portion of the stand with its lower sidewalls below the brush motor removed to show how a multidirectional linkage connects a brush to the brush motor; and, FIG. 7 is a side view of the portable brushing stand seen in FIG. 1 as used by an animal.

A brush motor 50 is connected to the hand portion 44 and the brush 60 is releasably and pivotally attached to the brush motor 50 at a proximal end 62 of the brush 60. The brush 60 extends downward away from the brush motor 50 and has a brush distal end 64. The brush 60 is operated by the brush motor 50 to spin the brush 60 around a vertical axis 66 of the brush 60 while the brush distal end 64 is also able to swing around a horizontal arc 68 relative to the proximal end 62 of the brush 60, as shown in an active combination of FIGS. 1 and 5, for example. Further in this regard, the brush distal end 64 may swing in a vertical arc 70 relative to the proximal end 62 of the brush 60 as well as the horizontal arc 68. Such vertical arc 70, can be, preferably, from about 30 degrees below horizontal point 72 to 90 degrees below at horizontal point 74 and back up to about 30 degrees below horizontal point 76. Preferably, as shown expressly in all Figs. except 6, the proximal end 62 of the brush 60 and/or the brush motor 50 may be located inside the hand portion 44. More preferably, the brush motor 50 may also be wholly contained inside the tubular stand.

The internal fluid pathway 90 extends from the hand portion 44 to the base and is configured to receive animal hair and have the animal hair pass therethrough via air flow arrows 92 to a vacuum 100. The vacuum 100 is mounted and/or configured to create negative pressure, by any conventional means, within the internal fluid pathway 90 and suck up animal hair in proximity to the hand portion 44 and/or the base 20. The vacuum 100, preferably, is mounted between the base end and the hand end, and more preferably, wholly contained inside the tubular stand. The vacuum 100 deposits the sucked up hair and dander into a receptacle 102, which can be opened at receptacle door 104 (FIG. 3) shown by movement arrows 105. There is a proximity sensor 110 mounted in position to sense when the animal is in proximity to any one of the brush, the stand or the base. For example, this sensor can be connected to the body portion 32, and preferably the proximity sensor 110 can be located closer to the base than to the arm portion 40.

Controller 120 is connectable to a power source, for example via a conventional household electrical cord 122. Controller 120 is electrically connected (not shown) to each of the brush motor, the vacuum and the proximity sensor. The controller is designed to (i) receive an animal sensing signal from the proximity sensor, (ii) operate the brush motor in response to the animal sensing signal, and (iii) operate the vacuum in response to the animal sensing signal. The controller can include conventional parts and software to operate the motors as taught herein. This can include a microprocessor, programmable logic controller, switch and relay logic, or similar functioning controller mechanisms. The motors are also conventional motors, preferably operated by electricity, and controlled by the controller through conventional connection/communication means. Preferably, the brush motor and vacuum are operated for a period of time, as can be programmed into the controller 120 and/or manually overridden by the pet's owner, when the animal 12 passes within proximity of the proximity sensor 110 and the animal sensing signal is sent to the controller 120. In this way, the stand 30 is not operating all the time, to save energy and only be operational when triggered by the animal 12. Animals are learning creatures, and the inventor has been surprised how quickly his dog has learned to use the portable brushing stand 10, and to really enjoy it and the independence it gives the dog for self-grooming.

In a preferred feature, the tubular stand also includes a height sensor 130 mounted in position to sense a height of the animal when the animal is in proximity to the stand. The height sensor is electrically connected to the controller to send an animal height signal. Controller 120 can be, for example, connected to the body portion 32, and preferably is located between the proximity sensor 110 and the arm 40, as shown in FIGS. 1 and 2. The controller is designed to: (i) receive the height sensing signal from the height sensor, and (ii) operate the adjustment motor in response to the height sensing signal to move the body portion between the down position and the up position when the animal 12 is in proximity to the base. Further, the controller can be programmed to adjust the height, as desired, to a signaled height. The controller can also enable manual adjustment, or overriding the controller and/or adjustment motor to do manual selective adjustment. In some embodiments the height sensor 130 can include at least two separate height sensors 130, 132 and each separate height sensor 130, 132 electrically communicates with the controller 120 to send height signal information to the controller when the animal 12 is in proximity to the base. The controller 120 then uses this information to better determine the preferred height of the body portion 32 of the stand and control the adjustment motor 140 accordingly, based on the sensed height of the animal.

As illustrated in FIG. 6, the brush 60 is releasably and pivotally attached to the brush motor 50, for example preferably, by a multidirectional linkage 78 connecting the brush proximal end 62 to the brush motor 50. The brush 60 releasably and pivotally attached to the brush motor 50 can also, preferably, include a friction fit 80 quick release male end fit into a female receiver connecting the brush proximal end 62 to the brush motor 50. For example, this can be like a conventional socket and socket wrench connected relationship or a similar connected conventional relationship with a quick release mechanism 82 for the brush 60 to be manually pulled from the brush motor 50 if anything gets wrapped around the brush 60 while it is spinning (e.g., an animal with really long hair, or a nearby human child's hair if the child has long hair and gets too close to the spinning brush 60 or brush arm 61).

Each and every document cited in this present application, including any cross referenced or related patent or application, is incorporated in this present application in its entirety by this reference, unless expressly excluded or otherwise limited. The citation of any document is not an admission that it is prior art with respect to any embodiment disclosed in this present application or that it alone, or in any combination with any other reference or references, teaches, suggests, or discloses any such embodiment. Further, to the extent that any meaning or definition of a term in this present application conflicts with any meaning or definition of the same term in a document incorporated by reference, the meaning or definition assigned to that term in this present application governs.

The present invention includes the description, examples, embodiments, and drawings disclosed; but it is not limited to such description, examples, embodiments, or drawings. As briefly described above, the reader should assume that features of one disclosed embodiment can also be applied to all other disclosed embodiments, unless expressly indicated to the contrary. Unless expressly indicated to the contrary, the numerical parameters set forth in the present application are approximations that can vary depending on the desired properties sought to be obtained by a person of ordinary skill in the art without undue experimentation using the teachings disclosed in the present application. Modifications and other embodiments will be apparent to a person of ordinary skill in the packaging arts, and all such modifications and other embodiments are intended and deemed to be within the scope of the present invention.

What is claimed is:

1. A brushing stand operable by an animal comprising:
   a base with a tubular stand connected to the base and having a body portion extending upward away from the base, the body portion being selectively adjustable between a down position and an up position;
   the tubular stand including an arm portion at a distal end of the body portion and the arm portion extending horizontally away from the body portion, with a hand portion at an end of the arm portion and separated from the body portion by the arm portion, the hand portion extending downward away from the arm portion;
   a brush motor connected to the hand portion and a brush releasably and pivotally attached to the brush motor at a proximal end of the brush, the brush extending downward away from the brush motor and having a brush distal end, the brush being operated by the brush motor to spin the brush around a vertical axis of the brush while the brush distal end is also able to swing around a horizontal arc relative to the proximal end of the brush;
   an internal fluid pathway extending from the hand portion to the base and configured to receive animal hair;
   a vacuum configured to create negative pressure within the internal fluid pathway and suck up animal hair in proximity to the hand portion and the base, the internal fluid pathway configured to have the animal hair pass therethrough to the vacuum;
   a proximity sensor mounted in position to sense when the animal is in proximity to the brush; and,
   a controller connectable to a power source and electrically connected to each of the brush motor, the vacuum and the proximity sensor, the controller configured to:
   receive an animal sensing signal from the proximity sensor,
   operate the brush motor in response to the animal sensing signal, and
   operate the vacuum in response to the animal sensing signal.

2. The stand of claim 1, wherein the proximal end of the brush is located inside the hand portion.

3. The stand of claim 1, wherein the brush motor is located inside the hand portion.

4. The stand of claim 1, further comprising a height sensor mounted in position to sense a height of the animal when the animal is in proximity to the stand, the height sensor electrically connected to the controller.

5. The stand of claim 1, wherein selectively adjustable comprises an adjustment motor connected to the tubular stand, the controller electrically connected to the adjustment motor and the controller configured to operate the adjustment motor to move the body portion between the down position and the up position.

6. The stand of claim 4, wherein selectively adjustable comprises an adjustment motor connected to the tubular stand, the controller electrically connected to the adjustment motor and the controller configured to:
   receive a height sensing signal from the height sensor,
   operate the adjustment motor in response to the height sensing signal to move the body portion between the down position and the up position.

7. The stand of claim 1, wherein the base has an internal hollow portion extending from a perimeter of the base to a center of the base and in communication with the internal fluid pathway, and thereby negative pressure within the internal fluid pathway and the internal hollow portion suck up animal hair in proximity to the perimeter of the base.

8. The stand of claim 1, wherein the base comprises a weight and diameter sufficient to keep the tubular stand essential upright during use of the stand.

9. The stand of claim 1, wherein the brush distal end can swing in a vertical arc relative to the proximal end of the brush as well as the horizontal arc.

10. The stand of claim 9, wherein the vertical arc is from about 30 degrees below horizontal to 90 degrees below horizontal and back up to about 30 degrees below horizontal.

11. The stand of claim 4, wherein the height sensor comprises at least two separate height sensors to sense the height of the animal when the animal is in proximity to the stand and each separate height sensor is electrically connected to the controller.

12. The stand of claim 1, wherein the brush releasably and pivotally attached to the brush motor comprises a multidirectional linkage connecting to the brush proximal end to the brush motor.

13. The stand of claim 1, wherein the brush releasably and pivotally attached to the brush motor comprises a friction fit quick release male end within a female receiver connecting the brush proximal end to the brush motor.

14. The stand of claim 5, wherein the vacuum, the brush motor and the adjustment motor are each wholly contained inside the tubular stand.

15. A portable brushing stand operable by an animal comprising:
   a base with a tubular stand connected to the base and having a body portion extending upward away from the base, the body portion being selectively adjustable between a down position and an up position by an adjustment motor connected to the body portion and operating the adjustment motor moves the body portion between the down position and the up position;
   the tubular stand including an arm portion at a distal end of the body portion and the arm portion extending horizontally away from the body portion, with a hand portion at an end of the arm portion and separated from the body portion by the arm portion, the hand portion extending downward away from the arm portion;
   a brush motor connected to the hand portion and a brush releasably and pivotally attached to the brush motor at a proximal end of the brush, the brush extending downward away from the brush motor and having a brush distal end, the brush being operated by the brush motor to spin the brush around a vertical axis of the brush while the brush distal end is also able to swing around (i) a horizontal arc relative to the proximal end of the brush and (ii) a vertical arc relative to the proximal end of the brush;
   an internal fluid pathway extending from the hand portion to the base and configured to receive animal hair;
   a vacuum configured to create negative pressure within the internal fluid pathway and suck up animal hair in proximity to the arm portion and the base, the internal fluid pathway configured to have the animal hair pass therethrough to the vacuum;
   a proximity sensor mounted to the tubular stand to sense when the animal is in proximity to the base, the stand or the brush; and,
   a controller electrically connected to each of the adjustment motor, the brush motor, the vacuum and the proximity sensor, the controller configured to:
   receive an animal sensing signal from the proximity sensor,
   operate the brush motor in response to the animal sensing signal, and operate the vacuum in response to the animal sensing signal.

16. The stand of claim 15, further comprising a height sensor connected to the tubular stand and located between the proximity sensor and the arm to sense a height of the animal when the animal is in proximity to the base, the height sensor electrically connected to the controller.

17. The stand of claim 16, wherein selectively adjustable comprises the controller configured to:
receive a height sensing signal from the height sensor, and operate the adjustment motor in response to the height sensing signal to move the body portion between the down position and the up position.

18. The stand of claim 15, wherein the vertical arc is from about 30 degrees below horizontal to 90 degrees below horizontal and back up to about 30 degrees below horizontal.

19. The stand of claim 15, wherein the brush releasably and pivotally attached to the brush motor comprises a multidirectional linkage connecting to the brush proximal end to the brush motor.

20. A brushing stand operable by an animal comprising:
a tubular stand being selectively adjustable between a down position and an up position, the tubular stand including an internal fluid pathway extending from a base end to a hand end and configured to receive animal hair and have the animal hair pass therethrough;
a vacuum mounted and configured to create negative pressure within the internal fluid pathway and suck up animal hair in proximity to at least one of the base end and the hand end;
a brush motor connected to the tubular stand and a brush releasably and pivotally attached to the brush motor at a proximal end of the brush, the brush extending downward away from the brush motor and having a brush distal end, the brush being operated by the brush motor to spin the brush around a vertical axis of the brush while the brush distal end is also able to swing around a horizontal arc relative to the proximal end of the brush;
a proximity sensor mounted in position to sense when the animal is in proximity to the tubular stand or the brush; and,
a controller connectable to a power source and electrically connected to each of the brush motor, the vacuum and the proximity sensor, the controller configured to:
receive an animal sensing signal from the proximity sensor,
operate the brush motor in response to the animal sensing signal, and
operate the vacuum in response to the animal sensing signal.

* * * * *